(12) United States Patent
McAfee et al.

(10) Patent No.: US 9,158,493 B2
(45) Date of Patent: Oct. 13, 2015

(54) PAGE DESCRIPTION LANGUAGE PACKAGE FILE PREVIEW

(75) Inventors: Robert K. McAfee, San Jose, CA (US); Ken Chiu, Aptos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1182 days.

(21) Appl. No.: 11/864,694

(22) Filed: Sep. 28, 2007

(65) Prior Publication Data

US 2014/0033017 A1    Jan. 30, 2014

(51) Int. Cl.
*G06F 17/00* (2006.01)
*G06F 3/14* (2006.01)
*G06F 17/21* (2006.01)
*G06F 17/22* (2006.01)
*G06F 3/0484* (2013.01)

(52) U.S. Cl.
CPC .............. *G06F 3/14* (2013.01); *G06F 3/04842* (2013.01); *G06F 17/211* (2013.01); *G06F 17/212* (2013.01); *G06F 17/2205* (2013.01); *G06F 17/2264* (2013.01); *G06F 2203/04803* (2013.01)

(58) Field of Classification Search
CPC .......... G06F 17/30011; G06F 17/2247; G06F 17/2205; G06F 17/21; G06F 2203/04803; G06F 3/04842; G06F 3/14; G06F 17/212; G06F 17/2264
USPC .......................... 715/200, 201, 204, 209, 210
See application file for complete search history.

(56) References Cited

U.S. PATENT DOCUMENTS

| | | | |
|---|---|---|---|
| 5,706,457 A * | 1/1998 | Dwyer et al. | 715/835 |
| 6,237,011 B1 * | 5/2001 | Ferguson et al. | 715/234 |
| 6,278,455 B1 | 8/2001 | Baker | |
| 6,292,186 B1 | 9/2001 | Lehman et al. | |

(Continued)

FOREIGN PATENT DOCUMENTS

WO    WO-2009045679 A1    4/2009
WO    WO-2009143139 A2    11/2009

OTHER PUBLICATIONS

Toub S. View Data Your Way With Our Managed Preview Handler Framework. MSDN [serial online]. Jan. 2007;vol. 22 Issue 1, pp. 52-67. Available from: Computers & Applied Sciences Complete, Ipswich, MA. Accessed Feb. 11, 2011.*

(Continued)

*Primary Examiner* — Thu Huynh
(74) *Attorney, Agent, or Firm* — Shook, Hardy & Bacon L.L.P.

(57) ABSTRACT

Various embodiments described herein provide systems, methods, and software to preview files packaged, or otherwise embedded, within page description language documents. Such previews may be viewed without opening a larger application typically used to view such files. Some embodiments include presenting, in a page description language document reader application, a representation of a file packaged within a page description language document and receiving a selection of the packaged file to preview the file within the page description language document reader application. Some embodiments further include selecting a utility to open the packaged file as a function of a file type of the packaged file and calling the selected utility to open the packaged file with a reference to a location where packaged file is located.

17 Claims, 4 Drawing Sheets

(56) References Cited

U.S. PATENT DOCUMENTS

| | | | |
|---|---|---|---|
| 6,304,897 B1 | 10/2001 | Venkatraman et al. | |
| 6,636,246 B1 | 10/2003 | Gallo et al. | |
| 7,013,435 B2 | 3/2006 | Gallo et al. | |
| 7,031,968 B2* | 4/2006 | Kremer et al. | 707/706 |
| 7,035,880 B1 | 4/2006 | Crescenti et al. | |
| 7,076,728 B2 | 7/2006 | Davis et al. | |
| 7,089,248 B1 | 8/2006 | King et al. | |
| 7,139,977 B1 | 11/2006 | Russell | |
| 7,412,650 B2 | 8/2008 | Gallo | |
| 7,506,359 B1* | 3/2009 | Ling | 726/2 |
| 7,603,615 B2* | 10/2009 | Lee et al. | 715/200 |
| 7,634,775 B2 | 12/2009 | McLuckie et al. | |
| 7,823,064 B1* | 10/2010 | Levy | 715/242 |
| 7,913,053 B1 | 3/2011 | Newland | |
| 8,479,087 B2 | 7/2013 | Swineford et al. | |
| 8,578,261 B1* | 11/2013 | Gupta et al. | 715/208 |
| 2001/0039540 A1* | 11/2001 | Hofmann et al. | 707/3 |
| 2002/0059337 A1* | 5/2002 | Takaoka et al. | 707/500 |
| 2002/0073058 A1* | 6/2002 | Kremer et al. | 707/1 |
| 2002/0147735 A1 | 10/2002 | Nir | |
| 2003/0033296 A1 | 2/2003 | Rothmuller et al. | |
| 2003/0066027 A1 | 4/2003 | Nakagiri | |
| 2003/0115171 A1 | 6/2003 | Mangalvedhekar | |
| 2003/0196120 A1 | 10/2003 | Raley et al. | |
| 2004/0004636 A1 | 1/2004 | van Driel | |
| 2004/0049513 A1 | 3/2004 | Yakir et al. | |
| 2004/0205633 A1* | 10/2004 | Martinez et al. | 715/526 |
| 2004/0210535 A1 | 10/2004 | Erickson | |
| 2004/0215657 A1 | 10/2004 | Drucker et al. | |
| 2005/0151756 A1 | 7/2005 | Miyamoto et al. | |
| 2005/0177389 A1 | 8/2005 | Rakowicz | |
| 2005/0193330 A1 | 9/2005 | Peters | |
| 2005/0209955 A1 | 9/2005 | Underwood et al. | |
| 2005/0210416 A1 | 9/2005 | MacLaurin et al. | |
| 2005/0216532 A1 | 9/2005 | Lallier | |
| 2005/0240618 A1* | 10/2005 | Nickerson et al. | 707/102 |
| 2005/0251748 A1* | 11/2005 | Gusmorino et al. | 715/713 |
| 2005/0268217 A1 | 12/2005 | Garrison | |
| 2006/0074869 A1* | 4/2006 | Rosenberg et al. | 707/3 |
| 2006/0156228 A1 | 7/2006 | Gallo et al. | |
| 2006/0161863 A1 | 7/2006 | Gallo | |
| 2006/0178215 A1 | 8/2006 | Lehikoinen et al. | |
| 2006/0184540 A1 | 8/2006 | Kung et al. | |
| 2006/0206807 A1 | 9/2006 | Rosner et al. | |
| 2006/0291504 A1 | 12/2006 | Cohn | |
| 2007/0016546 A1 | 1/2007 | De Vorchik et al. | |
| 2007/0033237 A1 | 2/2007 | Prahlad et al. | |
| 2007/0050412 A1 | 3/2007 | Robertson et al. | |
| 2007/0067362 A1 | 3/2007 | McArdle | |
| 2007/0168374 A1 | 7/2007 | Bourne et al. | |
| 2007/0204211 A1 | 8/2007 | Paxson | |
| 2007/0226204 A1 | 9/2007 | Feldman | |
| 2007/0240079 A1 | 10/2007 | Flynt et al. | |
| 2008/0001946 A1* | 1/2008 | Ishikawa | 345/420 |
| 2008/0034381 A1 | 2/2008 | Jalon et al. | |
| 2008/0082575 A1* | 4/2008 | Peter et al. | 707/103 Z |
| 2008/0097879 A1* | 4/2008 | Sadowski et al. | 705/35 |
| 2008/0130966 A1* | 6/2008 | Crucs | 382/128 |
| 2009/0089656 A1 | 4/2009 | McAfee et al. | |
| 2009/0217173 A1 | 8/2009 | Manheimer | |
| 2009/0292980 A1 | 11/2009 | Swineford et al. | |
| 2010/0057765 A1 | 3/2010 | Dispensa et al. | |
| 2010/0057884 A1* | 3/2010 | Brownell et al. | 709/219 |
| 2010/0179943 A1 | 7/2010 | Anand et al. | |
| 2010/0306283 A1* | 12/2010 | Johnson et al. | 707/803 |
| 2014/0032478 A1 | 1/2014 | Mcafee | |
| 2014/0032482 A1 | 1/2014 | Dulaney et al. | |
| 2014/0033046 A1 | 1/2014 | Walsh et al. | |
| 2014/0033047 A1 | 1/2014 | Poling et al. | |

OTHER PUBLICATIONS

E. D. Zwicky, Further torture: more testing of backup and archive programs, in: Proceedings of the 17th Annual Large Installation Systems Administration Conference, LISA 2003, Oct. 2003, San Diego, CA, USA.*

F. Rice, "How to: Manipulate Office Open XML Formats Documents", Dec. 2006, archived Jan. 5, 2007, retrieved from http://web.archive.org/web/20070105053042/msdn2.microsoft.com/en-us/library/aa982683.aspx.*

"U.S. Appl. No. 12/123,624, Non Final Office Action mailed Dec. 7, 2010", 16 pgs.

"International Application Serial No. P0CT/US2009/044496, Search Report mailed Jun. 3, 2010", 4 pgs.

"International Application Serial No. PCT/US2009/044496, Written Opinion mailed Jun. 3, 2010", 6 pgs.

"CreativSpace image search—finally a cool image search", [Online] Retrieved from the internet: May 15, 2008 <URL:http://creativspace.at/>, 1 page.

"Dynamic PageFlip 3.4", [Online] Retrieved from the internet: Apr. 15, 2008 <URL:http://www.pageflip.hu/>, 2 pages.

"Great cover version", *Apple—iTunes—iTunes Jukebox—Cover Flow*, [Online] Retrieved from internet: May 19, 2008 <URL:http://www.apple.com/itunes/jukebox/coverflow.html>, 1 page.

"International Application Serial No. PCT/US2008/075388, International Search Report Mailed Jan. 13, 2009", 7 pgs.

"International Application Serial No. PCT/US2008/075388, Written Opinion mailed Jan. 13, 2009", 7 pgs.

"Open Packaging Format (OPDF) 2.0 v0.984", [Online]. Retrieved from the Internet: <URL:http://www.idpf.org/2007/opf/OPF 2.0 0.984 draft.html>, (Apr. 16, 2007), 35 pgs.

"POD Tech Combine PDF's", Adobe Acrobat 8 Packages: Combine PDFs | PodTech.net, [Online]Retrieved from the internet: Apr. 15, 2008 <URL:http://www.podtech.net/home/1761/adobe-acrobat-8-packages-combine-pdfs>, (Dec. 29, 2006), 2 pages.

"Specifications for the Digital Talking Book", http://www.niso.org/workrooms/daisy/Z39-86-2005.pdf, Navigation Control File (NCX), (Apr. 21, 2005), 43-56.

37 SIGNALS, "Signal vs. Noise", *Cover Flow and the scrolling horizontal subnav at the new Apple.com*, [Online]. Retrieved from the internet: <URL:http://www.37signals.com/svn/posts/464-cover-flow-and-the-scrolling-%20horizontal-subnav-at-the-new-applecom#extended>, (May 15, 2008), 18 pages.

Del Strother, Jonathan, et al., "Cover Flow", From Wikipedia, the free encyclopedia (Redirected from Cover flow), [Online] Retrieved from the internet: May 15, 2008 <URL:http://en.wikipedia.org/wiki/Cover_flow>, (Sep. 11, 2006), 2 pages.

Graham, Jamey, et al., "iCandy: a Tangible User Interface for iTunes", Copyright is held by the author/owner(s). CHI 2008, Apr. 5, 2008, Florence, Italy. ACM 978-1-60558-012-8/08/04., (Apr. 5, 2008), 6 pages.

"U.S. Appl. No. 11/864,714, Non-Final Office Action mailed Feb. 16, 2011", 20 pgs.

"U.S. Appl. No. 11/864,714, Response filed May 16, 2011 to Non-Final Office Action mailed Feb. 16, 2011", 9 pgs.

"U.S. Appl. No. 12/123,615, Non-Final Office Action mailed May 27, 2011", 30 pgs.

"U.S. Appl. No. 12/123,624, Final Office Action mailed May 27, 2011", 19 pgs.

"U.S. Appl. No. 12/123,624, Response filed Mar. 7, 2011 to Non-Final Office Action mailed Dec. 7, 2010", 8 pgs.

"U.S. Appl. No. 12/123,635, Non-Final Office Action mailed May 27, 2011", 19 pgs.

"U.S. Appl. No. 12/123,640, Non-Final Office Action mailed Jun. 9, 2011", 28 pgs.

"The Microsoft Office Open XML Formats, Preview for Developers", Microsoft, (Jun. 2005), 1-21.

Bott, et al., "Special Edition Using Microsoft Office 2007", Que Publishing, (Dec. 22, 2006), 62.

Rice, Frank, "How to: Manipulate Office Open XML Formats Documents", Microsoft, (Dec. 2006), 1-19.

"U.S. Appl. No. 11/864,714, Examiner Interview Summary mailed Nov. 29, 2011", 3 pgs.

"U.S. Appl. No. 11/864,714, Final Office Action mailed Aug. 5, 2011", 17 pgs.

(56) References Cited

OTHER PUBLICATIONS

"U.S. Appl. No. 11/864,714, Response filed Nov. 9, 2011 to Final Office Action mailed Aug. 5, 2011", 7 pgs.
"U.S. Appl. No. 12/123,615, Final Office Action mailed Sep. 28, 2011", 28 pgs.
"U.S. Appl. No. 12/123,615, Response filed Jan. 30, 2012 to Final Office Action mailed Sep. 28, 2011", 13 pgs.
"U.S. Appl. No. 12/123,615, Response filed Aug. 29, 2011 to Non-Final Office Action mailed May 27, 2011", 17 pgs.
"U.S. Appl. No. 12/123,624, Response filed Sep. 27, 2011 to Final Office Action mailed May 27, 2011", 9 pgs.
"U.S. Appl. No. 12/123,635, Final Office Action mailed Nov. 22, 2011", 24 pgs.
"U.S. Appl. No. 12/123,635, Response filed Feb. 22, 2012 to Final Office Action mailed Nov. 22, 2011", 14 pgs.
"U.S. Appl. No. 12/123,635, Response filed Aug. 29, 2011 to Non-Final Office Action mailed May 27, 2011", 12 pgs.
"U.S. Appl. No. 12/123,640, Final Office Action mailed Dec. 2, 2011", 32 pgs.
"U.S. Appl. No. 12/123,640, Response filed Sep. 9, 2011 to Non Final Office Action mailed Jun. 9, 2011", 12 pgs.
"U.S. Appl. No. 12/326,691, Non-Final Office Action mailed Nov. 15, 2011", 37 pgs.
"U.S. Appl. No. 12/326,691, Response filed Feb. 15, 2012 to Non-Final Office Action mailed Nov. 15, 2011", 11 pgs.
"U.S. Appl. No. 12/326,691, Response filed Sep. 1, 2011 to Restriction Requirement mailed Aug. 30, 2011", 9 pgs.
"U.S. Appl. No. 12/326,691, Restriction Requirement mailed Aug. 30, 2011", 6 pgs.
"U.S. Appl. No. 09/610,738, filed Jul. 6, 2000", 28 pgs.
"U.S. Appl. No. 12/123,615, Non Final Office Action mailed Oct. 5, 2012", 29 pgs.
"U.S. Appl. No. 12/123,635, Non Final Office Action mailed Jun. 7, 2012", 24 pgs.
"U.S. Appl. No. 12/123,635, Response filed Sep. 5, 2012 to Non-Final Office mailed Jun. 7, 2012", 14 pgs.
"U.S. Appl. No. 12/123,640, Response filed Jun. 1, 2012 to Non-Final Office Action mailed Dec. 2, 2012", 10 pgs.
"U.S. Appl. No. 12/326,691, Examiner Interview Summary mailed Jun. 29, 2012", 3 pgs.
"U.S. Appl. No. 12/326,691, Final Office Action mailed Apr. 18, 2012", 42 pgs.
"U.S. Appl. No. 12/326,691, Response filed Jul. 16, 2012 to Final Office Action mailed Apr. 18, 2012", 12 pgs.
"U.S. Appl. No. 11/864,714, Non Final Office Action mailed Sep. 20, 2012", 14 pgs.
"Acrobat Multimedia JavaScript Reference, Version: Acrobat 6.0", Adobe Systems Incorporated, (Apr. 2004), pp. 1-125.
"Adobe Presenter 6 User Guide", copyright 2006 Adobe, pp. 1-79.
"U.S. Appl. No. 11/864,714, Appeal Brief filed Jul. 9, 2013", 17 pgs.
"U.S. Appl. No. 11/864,714, Corrected Notice of Allowance mailed Jan. 30, 2014", 6 pgs.
"U.S. Appl. No. 11/864,714, Final Office Action mailed Apr. 17, 2013", 17 pgs.
"U.S. Appl. No. 11/864,714, Notice of Allowance mailed Oct. 24, 2013", 11 pgs.
"U.S. Appl. No. 11/864,714, Response filed Dec. 19, 2012 to Non-Final Office Action mailed Sep. 20, 2012", 7 pgs.
"U.S. Appl. No. 12/123,615, Notice of Allowance mailed Mar. 1, 2013", 17 pgs.
"U.S. Appl. No. 12/123,615, Response filed Jan. 7, 2013 to Non-Final Office Action mailed Oct. 5, 2012", 13 pgs.
"U.S. Appl. No. 12/123,615, Supplemental Notice of Allowance mailed Mar. 26, 2013", 5 pgs.
"U.S. Appl. No. 12/123,624, Non Final Office Action mailed Dec. 18, 2013", 27 pgs.
"U.S. Appl. No. 12/123,635, Examiner Interview Summary mailed Mar. 15, 2013", 3 pgs.
"U.S. Appl. No. 12/123,635, Final Office Action mailed Dec. 6, 2012", 27 pgs.
"U.S. Appl. No. 12/123,635, Notice of Allowance mailed Feb. 3, 2014", 9 pgs.
"U.S. Appl. No. 12/123,635, Response filed May 28, 2013 to Final Office Action mailed Dec. 6, 2012", 16 pgs.
"U.S. Appl. No. 12/123,640, Non Final Office Action mailed Jan. 31, 2014", 25 pgs.
"U.S. Appl. No. 12/326,691, Non Final Office Action mailed Oct. 21, 2013", 23 pgs.
"HyperCard: Installation and New Features", Apple Computers, (1998), pp. 1-149.
"International Application Serial No. PCT/US08/75388, International Preliminary Report on Patentability mailed Apr. 8, 2010", 7 pgs.
"HyperCard: Installation and New Features", Apple Computers, (1998), 1-149.

* cited by examiner

ACME Corporation
321 ACME Drive
Anytown, IA 52000
(800) 555-1212

Precision Corporation
Attn: John Smith
123 Precision Blvd
Nextown, IA 52200

102

Dear John,

Here is the proposal you requested for our services. The details of the proposal are set forth in the documents attached hereto. Instructions to execute these documents to finalize the agreement may be found in *file x.doc*.

112

Kindest regards,

Joe Smith

Sales
ACME Corp.
(800) 555-1212

| ATTACHMENTS | | | |
|---|---|---|---|
| FILE NAME 106 | | PACKED SIZE | UNPACKED SIZE |
| FILE X.DOC | | 32 kb | 55 kb |
| FILE Y.DOC | COMPRESSED | 22 kb | 65 kb |
| FILE Z.XLS | | 16 kb | 95 kb |
| 110 | 108 | 104 | |

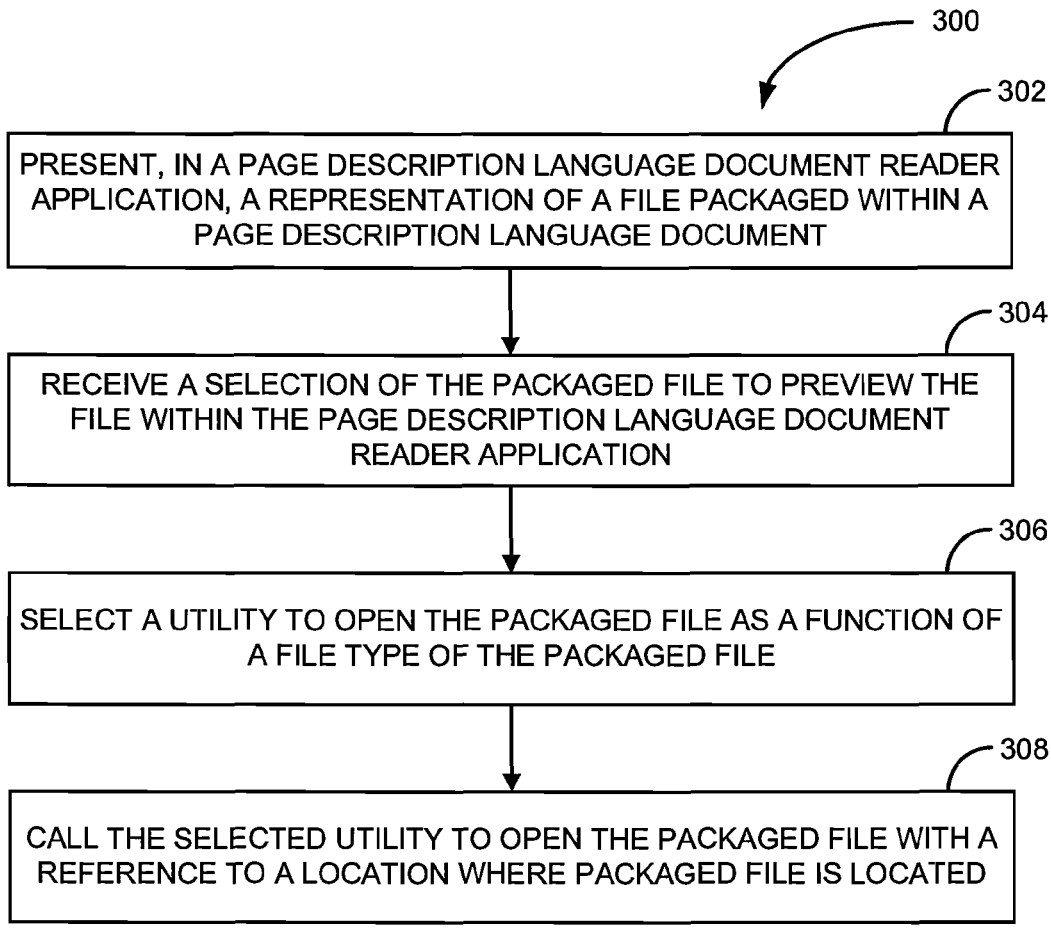

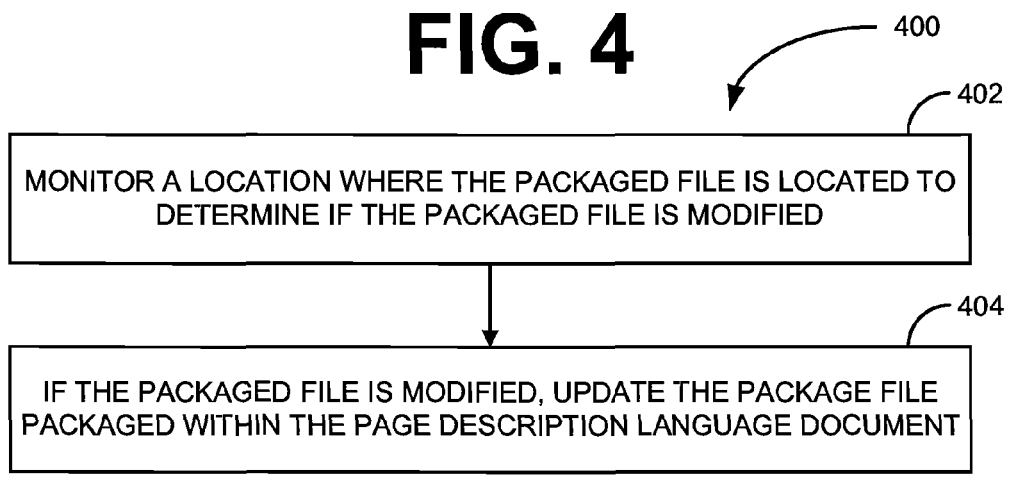

PAGE DESCRIPTION LANGUAGE PACKAGE FILE PREVIEW

BACKGROUND INFORMATION

Page description language documents, such as Portable Document Format documents are heavily used for many purposes. The number of purposes continues to grow as page description language specifications are expanded to provide more and more options for document creation and presentation. One of these options is the ability to package files within a page description language document.

BRIEF DESCRIPTION OF THE DRAWINGS

FIG. 1 is a user interface diagram of a page description language reader application including a packaged file detail pane according to an example embodiment.

FIG. 3 is a block flow diagram of a method according to an example embodiment.

FIG. 4 is a block flow diagram of a method according to an example embodiment.

DETAILED DESCRIPTION

Figure 2:
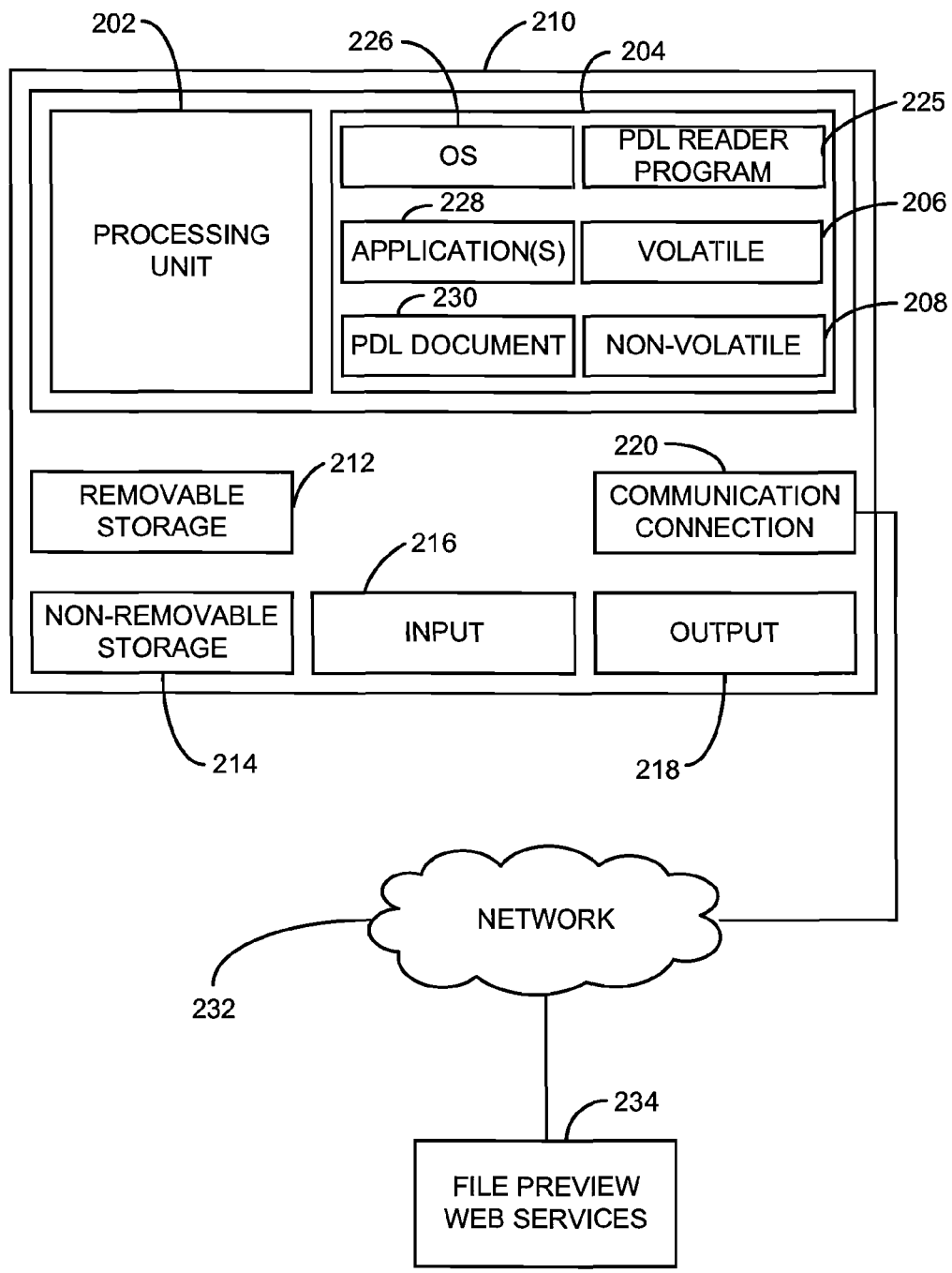
FIG. 2 is a block diagram of a computing device according to an example embodiment.

Various embodiments described herein provide systems, methods, and software to preview files packaged, or otherwise embedded, within page description language documents. Such previews may be viewed without opening a larger application typically used to view such files. For example, rather than launching an entire word processing application, which may take a considerable amount of time, a preview may be presented quickly through use of API's, utilities, plug-ins, software embedded within page description language reader applications, and the like. Files packaged within page description language documents, as a and the like. Files packaged within page description language documents, as a result, may be viewed more quickly and through a common interface while decreases the amount of processing resources consumed.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a user interface diagram 100 of a page description language reader application including a packaged file detail pane 104 according to an example embodiment. In typical embodiments, text of a page description language document is displayed in a document pane 102 of the application. Files 106, 108, and 110 attached or embedded in the page description language document may be displayed in the file detail pane 104. There may be one or more files displayed in the file detail pane 104. One or more of these files may be a compressed file of a compressed archive interleaved within the page description language document. One or more of these files may be a compressed archive including one or more compressed files. The files may also be virtually any file type, such as word processing documents, spreadsheets, text files, images, audio files, video files, and the like.

In some embodiments, when a file in the file detail pane 104 is selected, the page description language reader application provides one or more options for viewing content of the file, which includes a preview option to allow viewing of a selected file without opening an application normally used to view and edit files of the selected file type. In some embodiments, the preview option may present a selected file within a pane of the user interface 100, within a pane of a popup window, or within a computer program, such as a utility, capable of presenting all or a portion of a selected file.

Although the files 106, 108, 110 are displayed in the file detail pane 104, some embodiments may include displaying a link to view a packaged file within text of the page description language document. For example, the text of the page description language document displayed in the document pane 102 may include one or more hyperlinks 112 to one or more of the packaged files 106, 108, 110. In some embodiments, the packaged files 106, 108, 110 may be presented in a file detail pane 104 located in a different portion of the user interface 100, in a different manner, or exclusively within the body of a page description language document.

FIG. 2 is a block diagram of a computing device according to an example embodiment. In one embodiment, multiple such computer systems are utilized in a distributed network to implement multiple components in a transaction-based environment. An object oriented, service oriented, or other architecture may be used to implement such functions and communicate between the multiple systems and components. One example computing device in the form of a computer 210, may include a processing unit 202, memory 204, removable storage 212, and non-removable storage 214. Memory 204 may include volatile memory 206 and non-volatile memory 208. Computer 210 may include—or have access to a computing environment that includes—a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 210 may include or have access to a computing environment that includes input 216, output 218, and a communication connection 220. The communication connection 220 may be a network interface card. The computer may operate in a networked environment using the communication connection 220 to connect to one or more remote computers, such as database servers or web servers, which may provide access to web services 234 to perform one or more functions. The remote computer may include a personal computer (PC), server, router, network PC, a peer device or other common network node, or the like. The communication connection 220 may be connected to a network 232, which may include one or more of a Local Area Network ("LAN"), a Wide Area Network ("WAN"), the Internet, or other networks.

Computer-readable instructions stored on a computer-readable medium are executable by the processing unit 202 of the computer 210. A hard drive, CD-ROM, and RAM are some examples of articles including a computer-readable medium. The computer-readable medium instructions may include instructions of an operating system 226, such as an operating system of from the Microsoft® Windows® family of operating systems, a MAC® OS operating system, Linux, or other operating system. Some such operating systems 226 may include utilities, which may be called to open files. Some such utilities may allow a file to be previewed without requiring an application normally used to open files of a certain type to be started. Some such utilities may also allow a user to edit a previewed file, although editing may be limited to a certain amount of editing functionality. Examples of such utilities may include Notepad and WordPad, which are typically included in MICROSOFT® WINDOWS® operating systems. Another example utility included within MICROSOFT® WINDOWS® operating systems is the WINDOWS® Graphics Device Interface Plus, or GDI+ which enables applications to use graphics and formatted text on video display devices. The computer-readable medium instructions may also include one or more computing applications 228. The computer applications 228 may include applications such as word processing applications, which may include MICROSOFT® Word, spreadsheet applications, audio/visual presentation applications that may present one or more of audio, images, and video, and other applications that may consume files for creation, presentation, editing, and other actions. Some such applications 228 may provide a utility that may be called by other applications to cause a view of a file created with a respective application to be displayed. Such utilities of applications 228 and operating systems 226 are typically made through application programming interface, or "API," calls.

In some embodiments, the computer-readable instructions also include a page description language reader program 225. The page description language reader program 225, such as the ADOBE® ACROBAT® program consumes page description language documents 230, parses such documents 230, and causes them to be displayed. A page description language document may be used to package several files, such as documents, spreadsheets, images, video, sound clips, other page description language documents, and the like. The page description language reader program 225 may cause a page description language document including packaged files to be displayed in a manner as illustrated and described with regard to FIG. 1. In some embodiments, the page description language reader program 225 may receive a selection of a file packaged within a page description language document to preview. The page description language reader program then calls a utility capable of presenting a preview of the selected file. As discussed above, the utility may be a utility of an application 228 or the operating system 226. The utility in some further embodiments may be a utility included within the page description language reader program 225 or a plug-in type of software, which may or may not be considered an application.

In some such embodiments, the packaged file preview is presented within a pane of the user interface of the page description language reader program 225, in a pop-up window, or in another location. A packaged file preview, depending on the file type and the utility used to present the preview, may only a preview of a portion of data within the packaged file. In some embodiments, the portion of data may be a thumbnail image of a portion of the packaged file, such as if a file size of the packaged file is greater than a certain file size threshold.

FIG. 3 is a block flow diagram of a method 300 according to an example embodiment. The method 300 typically includes presenting, in a page description language document reader application, a representation of a file packaged within a page description language document 302 and receiving a selection of the packaged file to preview the file within the page description language document reader application 304. Upon receipt of a packaged file preview selection, the method may include selecting a utility to open the packaged file as a function of a file type of the packaged file 306, such as selecting an image presentation utility if the file type is a JPEG image file, and calling 308 the selected utility to open the packaged file with a reference to a location where packaged file is located 306. In some embodiments, the page description language is ADOBE SYSTEMS INCORPORATED's Portable Document Format ("PDF"). The location where the packaged file is located may be a memory or hard disk address of a portion of a page description language document of the packaged document selected for preview.

The memory address may alternatively be a location in memory where a copy of the package file is placed for preview. Thus, the method 300 may also include extracting the packaged file selected for preview from the page description language document and storing the extracted packaged file to a memory device. However, the packaged file may also be extracted and stored to a hard disk and the address may be a hard disk address or other reference to a location on a hard disk, such as a directory/folder and file name.

In some embodiments, the packaged file may be compressed within the page description language document. In such embodiments, extracting the packaged file from the page description language document includes decompressing the packaged file. The decompression, in some embodiments, may be performed using compression/decompression functionality included in a page description language reader application. In other embodiments, the page description language reader application may utilize a decompression utility of an operating system or stand-alone compression application to perform the decompression through an API call.

In some embodiments, selecting a utility to open the packaged file 306 includes selecting a utility included in the page description language reader application, a utility of an operating system, or a utility of an application or plug-in. Such utilities are commonly called through an API of the respective utility. However, in some embodiments, the page description language reader application may call one or more web services available over a network, such as the Internet, to display a preview. In some such embodiments, a web service may be available to convert a selected package file from a first format to a second format that may be displayed within a user interface of the page description language reader application. Other web services may be called in such embodiments depending on the type of a packaged file selected for preview.

In some embodiments, the method 300, when selecting the utility to open the packaged file as a function of a file type of the packaged file 306 includes determining if a computer application including a utility to preview files of the type of the packaged file is installed on a computing device on which the method 300 is performed. If the computer application is installed, the method 300 includes selecting the utility of the computer application. However, if the utility is not installed, an error may be displayed indicating there is not an application or utility available to display the packaged file. In some embodiments, rather than displaying an error, a web service, as described above, may be called to generate a preview of the packaged file. In other embodiments, along with a displayed error, options may be presented, such as search for a web service to generate a preview or an option to use or select another application to display the packaged file, such as a text editor.

FIG. 4 is a block flow diagram of a method 400 according to an example embodiment. In some embodiments, depending on the functionality of a utility used to present a preview of a packaged file, the packaged file may be modified. In some such instances those modification may be saved back to the original page description language document. Some such embodiments include monitoring a location where the packaged file is located and opened from to determine if the packaged file is modified 402. If the packaged file is modified, the method 400 includes updating the package file packaged within the page description language document 404. Such an update may include modifying pointers within the page description language document, shifting data toward an end of a page description language document, generating a new page description language document to replace the old one, or other modifications to the page description language document.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
presenting, in a page description language document reader application, a representation of a file packaged within a page description language document, wherein when packaged within the page description language document, the file is compressed in a compressed archive interleaved within the page description language document, and wherein the page description language is Portable Document Format;
receiving, in the page description language document reader application, a selection of the packaged file to preview the file within the page description language document reader application;
selecting a utility to open the packaged file as a function of a file type of the packaged file; and
calling the selected utility to open, within a user interface of the page description language reader application, the packaged file with a reference to a location where the packaged file is located, wherein the utility is a web service accessed via a network interface device of a computing device on which the method is performed and configured to convert the package file from a first format to a second format compatible for viewing in the page description language document reader application.

2. The method of claim 1, wherein the packaged file is a word processing document encoded in a format of a word processing application.

3. The method of claim 1, further comprising:
extracting the packaged file from the page description language document;
storing the extracted packaged file to a memory device; and
wherein the reference to the location where the packaged file is located is an address within a memory device where the packed file is stored.

4. The method of claim 3, wherein the memory device is a hard disk.

5. The method of claim 3, wherein:
extracting the packaged file from the page description language document includes decompressing the packaged file.

6. The method of claim 1, wherein selecting the utility to open the packaged file as a function of a file type of the packaged file includes:
determining if a computer application including a utility to preview files of the type of the packaged file is installed on the computing device on which the method is performed;
if the computer application is installed, selecting the utility of the computer application when the computer application is not installed on the computing device on which the method is performed, calling the web service to generate a preview of the packaged file.

7. The method of claim 1, further comprising:
monitoring the location where the packaged file is located to determine if the packaged file is modified; and
if the packaged file is modified, updating the packaged file within the page description language document.

8. The method of claim 1, wherein the selection of the packaged file extracts the packaged file to a memory location to preview the file.

9. The method of claim 8, wherein the utility to open the packaged file opens the packaged file from the memory location.

10. The method of claim 1, further comprising:
determining whether the file is modified by monitoring the memory location where the file is located, wherein when a determination is made that the file is modified, packaging the file back into the page description language document.

11. A non-transitory computer-readable medium, with instructions stored thereon, which when executed cause a machine to:
receive, in a first user interface of a page description language reader application, a selection of a file packaged within a page description language document to preview, wherein when packaged within the page description language document, the file is compressed in a compressed archive interleaved within the page description language document, and wherein the page description language is Portable Document Format;
call a utility capable of presenting a preview of the selected file within a second user interface of the page description language reader application, wherein calling a utility capable of presenting the preview of the selected file includes:
determining if a utility capable of presenting the preview of the selected file is present on the machine;
when a utility capable of presenting the preview of the selected file is not present on the machine, calling a web service to generate a preview of the selected file, the web service configured to convert the package file from a first format to a second format compatible for viewing the preview in the page description language document reader application; and
presenting the preview of the selected file within the second user interface of the page description language reader application based on the preview generated by the called web service.

12. The medium of claim 11, the instructions further causing the machine to:
determine whether the selected file is modified by monitoring a memory location where the file is located, wherein when a determination is made that the file is modified, packaging the selected file back into the page description language document.

13. The medium of claim 12, wherein the selected file is compressed when packaged back into in the page description language document.

14. A system comprising:
at least one processor and at least one memory device;
a network interface device;
a page description language document, stored in the at least one memory device, the page description language document including one or more files packaged therein, wherein when packaged in the page description language document, the one or more files are compressed in a compressed archive interleaved within the page description language document, and wherein the page description language is Portable Document Format;
a page description language reader application in the at least one memory device, the page description language reader application executable by the at least one processor to:
identify platform, application, and web services capable of opening each of the one or more files packaged in the page description language document;
receive, within a first user interface of the page description language reader application, a command to open a selected file of the files packaged within the page description language document; and
issue a command, via the network interface device, to a web service identified as capable of converting the selected file from a first format to a second format compatible for opening, within a second user interface of the page description language reader application, the selected file with a reference to a location from which the platform or application service is to open the selected file from.

15. The system of claim 14, wherein the application service identified as capable of opening the selected file is a module of the page description language reader application.

16. The system of claim 14, the page description language reader application executable by the at least one processor further to:
determine whether the selected file is modified by monitoring a location of the at least one memory device where the selected file located, wherein when a determination is made that the file is modified, packaging the file back into the page description language document.

17. The system of claim 14, wherein when the one or more files are compressed, the compression performed by the page description language reader application.

* * * * *